(12) United States Patent
Yasumoto et al.

(10) Patent No.: US 9,038,231 B2
(45) Date of Patent: May 26, 2015

(54) WIPER DEVICE FOR VEHICLE

(75) Inventors: Ryo Yasumoto, Aichi-gun (JP); Susumu Kuniyasu, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 13/813,819

(22) PCT Filed: Dec. 27, 2011

(86) PCT No.: PCT/JP2011/080337
§ 371 (c)(1),
(2), (4) Date: Feb. 1, 2013

(87) PCT Pub. No.: WO2013/098979
PCT Pub. Date: Jul. 4, 2013

(65) Prior Publication Data
US 2014/0298607 A1    Oct. 9, 2014

(51) Int. Cl.
*B60S 1/52* (2006.01)
*B60S 1/32* (2006.01)
*B60S 1/48* (2006.01)

(52) U.S. Cl.
CPC .. *B60S 1/522* (2013.01); *B60S 1/52* (2013.01); *B60S 1/32* (2013.01); *B60S 1/482* (2013.01)

(58) Field of Classification Search
CPC ............. B60S 1/52; B60S 1/522; B60S 1/524
USPC ............... 15/250.04, 250.02, 250.01, 250.14; 239/284.1, 284.2
See application file for complete search history.

(56) References Cited

U.S. PATENT DOCUMENTS

| 2,748,416 | A | * | 6/1956 | Benoit | 15/250.04 |
| 3,226,755 | A | * | 1/1966 | Fox et al. | 15/250.14 |
| 3,336,619 | A | * | 8/1967 | Hoyler | 15/250.14 |
| 3,428,992 | A | * | 2/1969 | Di Giorgio | 15/250.04 |
| 4,969,227 | A | * | 11/1990 | Reed et al. | 15/250.14 |
| 6,536,069 | B1 | * | 3/2003 | Neag et al. | 15/250.14 |

FOREIGN PATENT DOCUMENTS

| DE | 2039672 A1 | | 2/1972 |
| EP | 0552399 A1 | * | 7/1993 |
| EP | 1449728 A2 | | 8/2004 |
| FR | 2933933 A1 | | 1/2010 |
| JP | Y2 61-22050 | | 7/1986 |
| JP | U-62-141571 | | 9/1987 |
| JP | U-3008142 | | 3/1995 |

(Continued)

OTHER PUBLICATIONS

Dec. 24, 2013 Office Action issued in Chinese Patent Application No. 201180025090.4 (with partial translation).

(Continued)

*Primary Examiner* — Gary Graham
(74) *Attorney, Agent, or Firm* — Oliff PLC

(57) ABSTRACT

Cleaning liquid is easily prevented from adhering to a main wiping side of a windshield glass when a main wiping side wiper, that rotates reciprocally, moves to a reciprocal rotation inbound side. Cleaning liquid is jetted-out from a jetting-out opening of a jetting-out nozzle, but the cleaning liquid does not stick to a reciprocal rotation outbound side of a driver's seat side wiper. Accordingly, the cleaning liquid does not remain without being wiped-off at a driver's seat side of a windshield glass.

2 Claims, 6 Drawing Sheets

(56) References Cited

FOREIGN PATENT DOCUMENTS

| | | |
|---|---|---|
| JP | B2-2907519 | 6/1999 |
| JP | A-2003-048517 | 2/2003 |

OTHER PUBLICATIONS

Oct. 6, 2014 Search Report issued in European Application No. 11864129.9.

* cited by examiner

WIPER DEVICE FOR VEHICLE

TECHNICAL FIELD

The present invention relates to a wiper device for a vehicle.

BACKGROUND ART

Patent Document 1 discloses a wiper for a vehicle that drives a pump for ejection that is provided at the front portion of an automobile, and supplies a cleaning liquid, such as washer liquid or tap water or the like that is stored in a liquid storage tank, to left and right wiper blades respectively, and jets-out the cleaning liquid from numerous respective jetting-out holes that are formed in the respective wiper blades, and rotates the respective wiper blades reciprocally while spraying the cleaning liquid onto the front windshield glass of the automobile, and thereby wipes-off and removes, by the respective wiper blades, the dirt, such as the oil film and dust and the like, that has adhered to the front windshield glass (refer to Patent Document 1).

Here, when the cleaning liquid is jetted-out at the reciprocal rotation outbound side (going side) and the reciprocal rotation inbound side (returning side) of the wiper blade by the jetting-out nozzle that is provided at the main wiping side wiper that rotates reciprocally, the cleaning liquid, that is ejected at the reciprocal rotation outbound side of the wiper blade when the wiper blade moves to the reciprocal rotation inbound side, is not wiped until the wiper blade moves to the reciprocal rotation outbound side the next time.

Accordingly, Patent Document 2 and Patent Document 3 disclose techniques of providing a mechanism or the like that switches the jetting-out direction so that the cleaning liquid does not adhere to the reciprocal rotation outbound side of the wiper blade at the time when the driver's seat side wiper moves to the reciprocal rotation inbound side (refer to, for example, Patent Document 2, Patent Document 3).

However, in the techniques disclosed in Patent Document 2 and Patent Document 3, there is the need for complex mechanisms or for an increase in the number of parts, and there is room for improvement.

[Patent Document 1] Japanese Utility Model Registration No. 3008142

[Patent Document 2] Japanese Utility Model Application Laid-Open No. 62-141571

[Patent Document 3] Japanese Patent No. 02907519

DISCLOSURE OF INVENTION

Technical Problem

In view of the above-described circumstances, an object of the present invention is to provide a wiper device for a vehicle that can easily prevent cleaning liquid from adhering to a wiping surface at which a windshield glass is wiped via a wiper blade.

Solution to Problem

A wiper device for a vehicle of a first aspect of the present invention has: a main wiping side wiper that wipes a main wiping side of a windshield glass via a wiper blade that is provided at a wiper arm that reciprocally rotates between a stopped position and a reversal position; a secondary wiping side wiper that wipes a secondary wiping side of the windshield glass via a wiper blade that is provided at a wiper arm that reciprocally rotates between a stopped position and a reversal position; and a jetting-out nozzle that is provided at the wiper arm of the secondary wiping side wiper, and jets-out cleaning liquid respectively to a reciprocal rotation outbound side of the wiper blade of the secondary wiping side wiper, and a reciprocal rotation outbound side of the wiper blade of the main wiping side wiper at the stopped position.

In the wiper device for a vehicle of the first aspect of the present invention, when cleaning liquid is jetted-out from the jetting-out nozzle, the cleaning liquid is supplied respectively to the reciprocal rotation outbound side of the wiper blade of the main wiping side wiper that is at the stopped position, and the reciprocal rotation outbound side of the wiper blade of the secondary wiping side wiper.

When the main wiping side wiper and the secondary wiping side wiper move from the stopped positions to the reciprocal rotation outbound sides that face toward the reversal positions, the respective reciprocal rotation outbound sides of the main wiping side wiper and the secondary wiping side wiper at the windshield glass are wiped-off and cleaned via the wiper blades by the supplied cleaning liquid.

When the main wiping side wiper and the secondary wiping side wiper arrive at the reversal positions, rotation reverses, and the main wiping side wiper and the secondary wiping side wiper move to the reciprocal rotation inbound sides that face toward the stopped positions. Then, when the main wiping side wiper and the secondary wiping side wiper move to the reciprocal rotation inbound sides, the respective reciprocal rotation inbound sides of the main wiping side wiper and the secondary wiping side wiper at the windshield glass are wiped-off and cleaned via the wiper blades by the remaining liquid of the cleaning liquid that remains on the windshield glass of the time of moving to the reciprocal rotation outbound sides before the reversal.

In this way, when the main wiping side wiper and the secondary wiping side wiper move from the reversal positions to the reciprocal rotation inbound sides that face toward the stopped positions, even if cleaning liquid continues to be jetted-out from the jetting-out nozzle, the cleaning liquid does not stick (adhere) to the reciprocal rotation outbound side of the main wiping side wiper.

Accordingly, when the main wiping side wiper moves to the reciprocal rotation inbound side, the adhering of the cleaning liquid to the main wiping side of the windshield glass is prevented.

In a wiper device for a vehicle of a second aspect of the present invention, the jetting-out nozzle jets-out the cleaning liquid to a reciprocal rotation inbound side of the wiper blade of the secondary wiping side wiper.

In the wiper device for a vehicle of the second aspect of the present invention, when the secondary wiping side wiper moves to the reciprocal rotation inbound side, the reciprocal rotation inbound side of the secondary wiping side wiper at the windshield glass is cleaned by the cleaning liquid that is jetted-out and supplied to the reciprocal rotation inbound side of the wiper blade of the secondary wiping side wiper from the jetting-out nozzle. Accordingly, the cleaning power of the reciprocal rotation inbound side of the secondary wiping side wiper at the windshield glass improves.

In a wiper device for a vehicle of a third aspect of the present invention, the main wiping side is made to be a driver's seat side, and the main wiping side wiper is made to be a driver's seat side wiper, and the secondary wiping side is made to be a front passenger's seat side, and the secondary wiping side wiper is made to be a front passenger's seat side wiper.

In the wiper device for a vehicle of the third aspect of the present invention, when the driver's seat side wiper moves to the reciprocal rotation inbound side, the adhering of the cleaning liquid to the driver's seat side of the windshield glass is prevented.

Advantageous Effects of Invention

In accordance with the wiper device for a vehicle of the first aspect of the present invention, the adhering of cleaning liquid to the wiping surface, at which the windshield glass is wiped via the wiper blade, can easily be prevented.

In accordance with the wiper device for a vehicle of the second aspect of the present invention, the cleaning power at the reciprocal rotation inbound side of the secondary wiping side wiper at the windshield glass improves, as compared with a structure in which cleaning liquid is not jetted-out to the reciprocal rotation inbound side of the wiper blade of the secondary wiping side wiper.

In accordance with the wiper device for a vehicle of the third aspect of the present invention, the adhering of cleaning liquid to the driver's seat side of the windshield glass can be prevented.

BEST MODES FOR CARRYING OUT THE INVENTION

Figure 1:
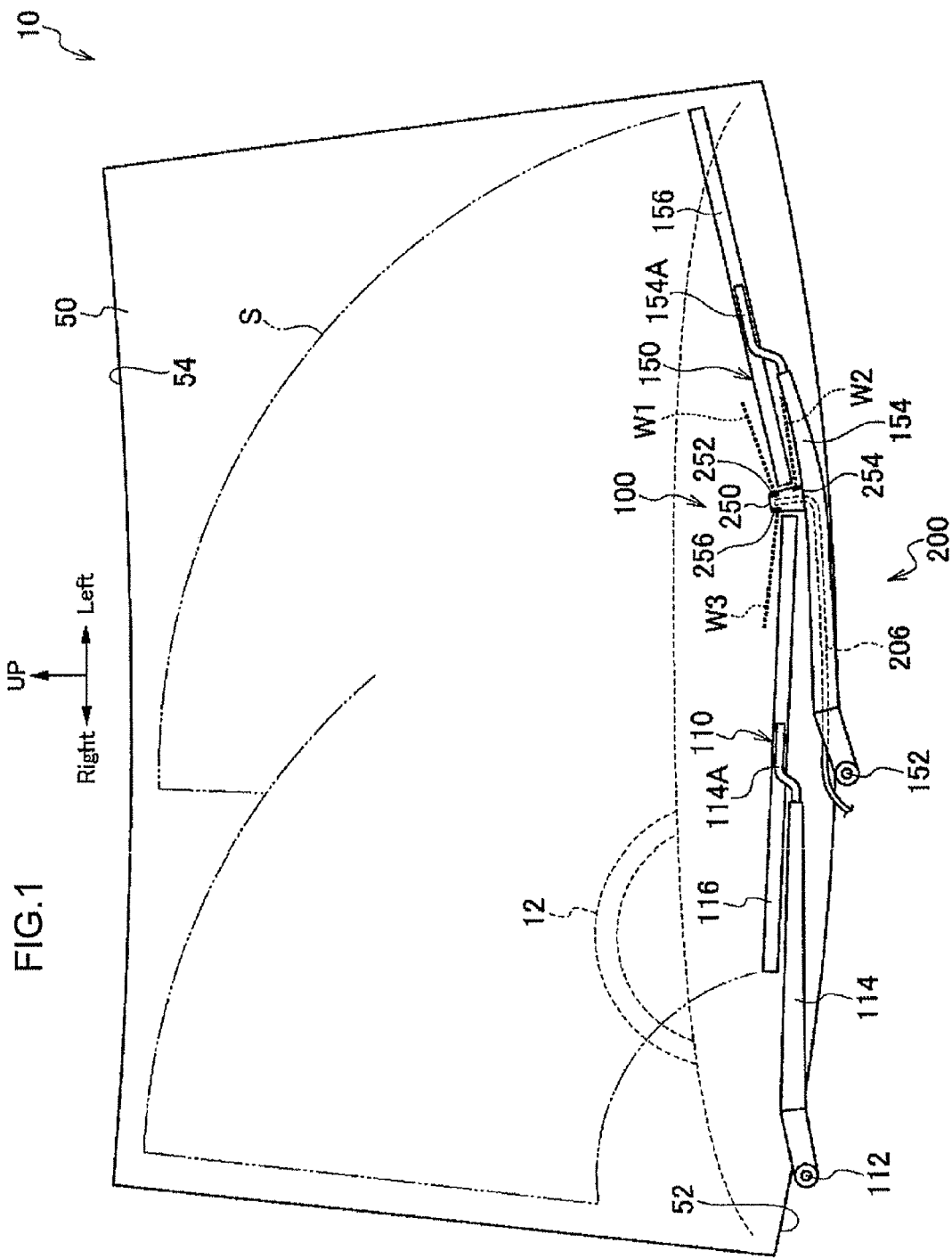
FIG. 1 illustrates a wiper device for a vehicle relating to an embodiment of the present invention, and is a front view of a state in which a driver's seat side wiper and a front passenger's seat side wiper are disposed at stopped positions.
Figure 2:
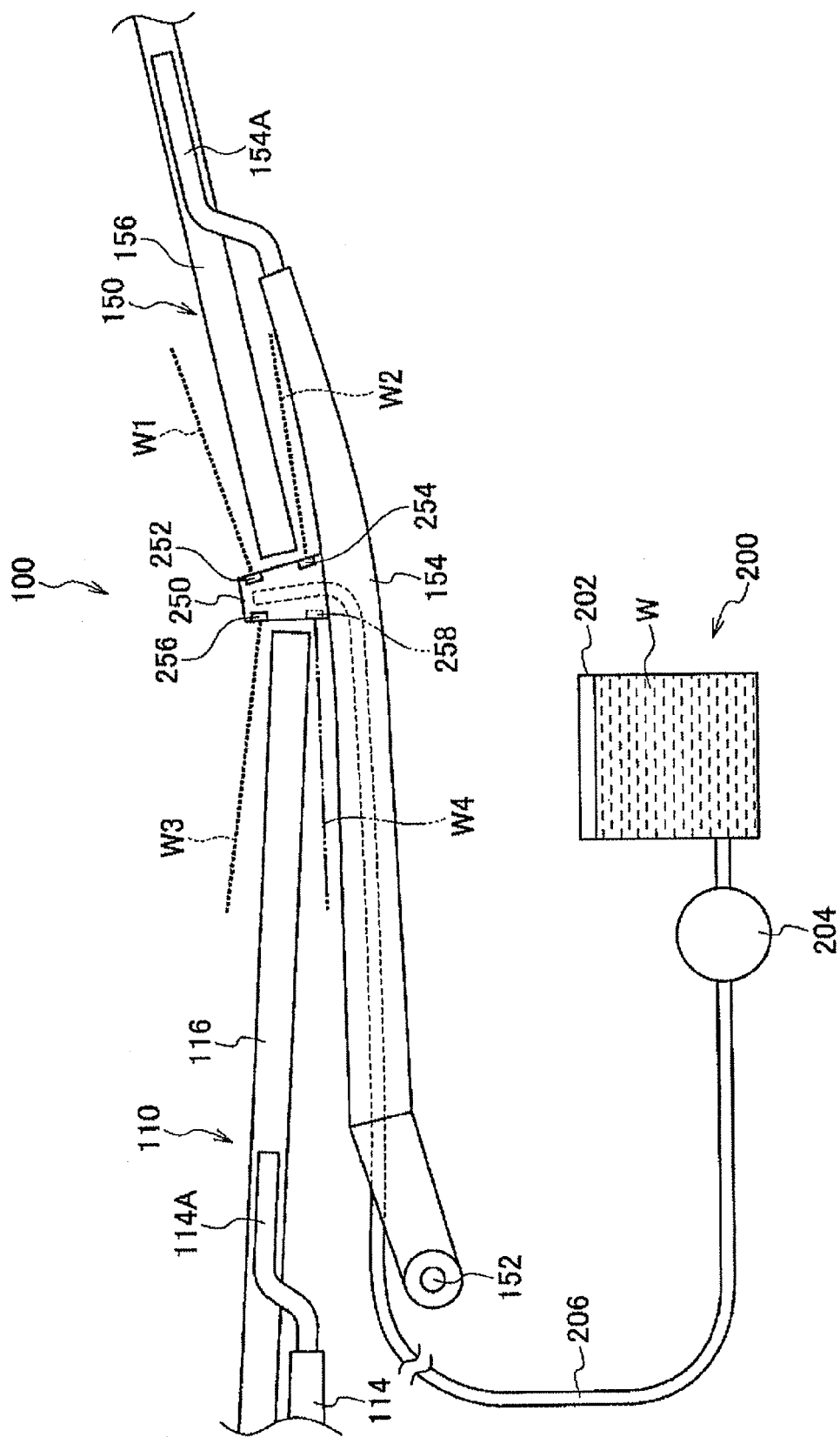
FIG. 2 is a drawing showing the structures of main portions of and a cleaning liquid jetting-out device of the wiper device for a vehicle shown in FIG. 1.
Figure 3:
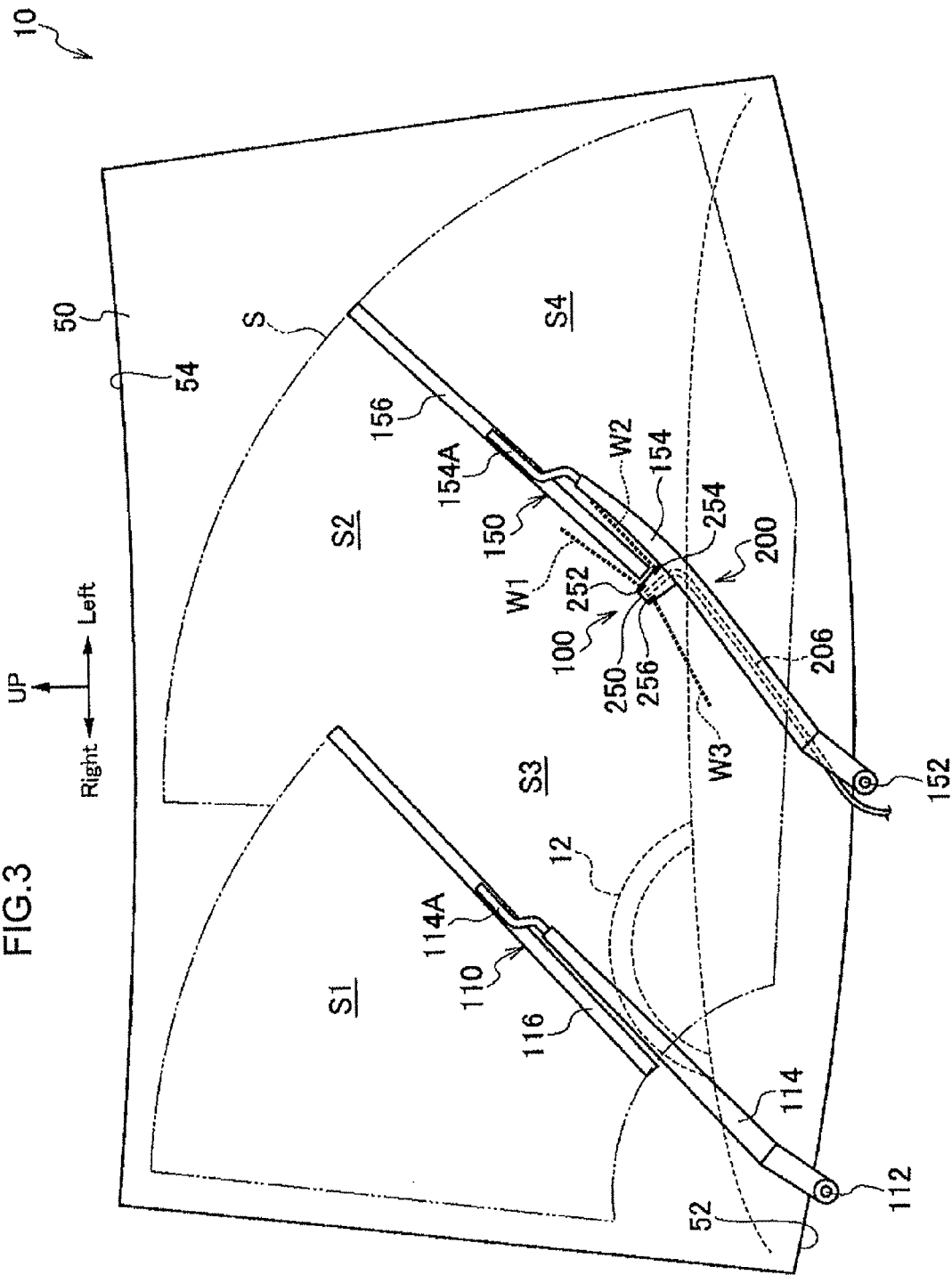
FIG. 3 illustrates the wiper device for a vehicle shown in FIG. 1, and is a front view of a state in which the driver's seat side wiper and the front passenger's seat side wiper are disposed at intermediate positions that are between the stopped positions and reversal positions.

A wiper for a vehicle relating to an embodiment of the present invention is described by using FIG. 1 through FIG. 3. Note that, in the respective drawings, the vehicle front-rear direction front side is indicated by arrow FR, and the vehicle vertical direction upper side is indicated by arrow UP. Further, the vehicle transverse direction right side in a case of facing in the vehicle traveling direction is indicated by arrow Right, and the vehicle transverse direction left side is indicated by arrow Left.

<Structure>

First, the structure of the present embodiment is described.

As shown in FIG. 1, a windshield glass (front windshield glass) 50 is disposed at a vehicle 10 at the vehicle rear side of a hood of the vehicle front portion that is omitted from the drawings. The windshield glass 50 is disposed in a state of being inclined toward the vehicle front-rear direction rear side, toward the vehicle vertical direction upper side. Note that a steering wheel 12 is disposed at the vehicle transverse direction right side of the vehicle cabin front portion of the vehicle 10 of the present embodiment. Accordingly, the vehicle transverse direction right side is made to be the driver's seat side (main wiping side) and the vehicle transverse direction left side is made to be the front passenger's seat side (secondary wiping side).

A wiper device 100 for a vehicle is structured to include a driver's seat side wiper 110 that serves as an example of a main wiping side wiper, a front passenger's seat side wiper 150 that serves as an example of a secondary wiping side wiper, and a cleaning liquid jetting-out device 200 shown in FIG. 2.

As shown in FIG. 1, the driver's seat side wiper 110 has a pivot shaft 112, a wiper arm 114, and a wiper blade 116. Similarly, the front passenger's seat side wiper 150 has a pivot shaft 152, a wiper arm 154 and a wiper blade 156.

The pivot shaft 112 of the driver's seat side wiper 110 is provided at the lower side of the vehicle transverse direction right side end portion at a lower edge portion 52 of the windshield glass 50, in a state in which the axial direction substantially runs along the direction of plate thickness of the windshield glass 50. On the other hand, the pivot shaft 152 of the front passenger's seat side wiper 150 is provided at the lower side of the vehicle transverse direction substantially central portion at the lower edge portion 52 of the windshield glass 50, in a state in which the axial direction substantially runs along the direction of plate thickness of the windshield glass 50.

The pivot shafts 112, 152 are mounted to arm retainers of the wiper arms 114, 154, respectively. Further, the wiper blades 116, 156 are mounted to arm pieces 114A, 154A that structure the wiper arms 114, 154.

Further, the driver's seat side wiper 110 and the front passenger's seat side wiper 150 are structured so as to reciprocally rotate on the surface (the vehicle front side surface) of the windshield glass 50, with the pivot shafts 112, 152 being the rotational axes respectively, by a wiper motor (drive source) and drive mechanism whose illustration is omitted.

Figure 4:
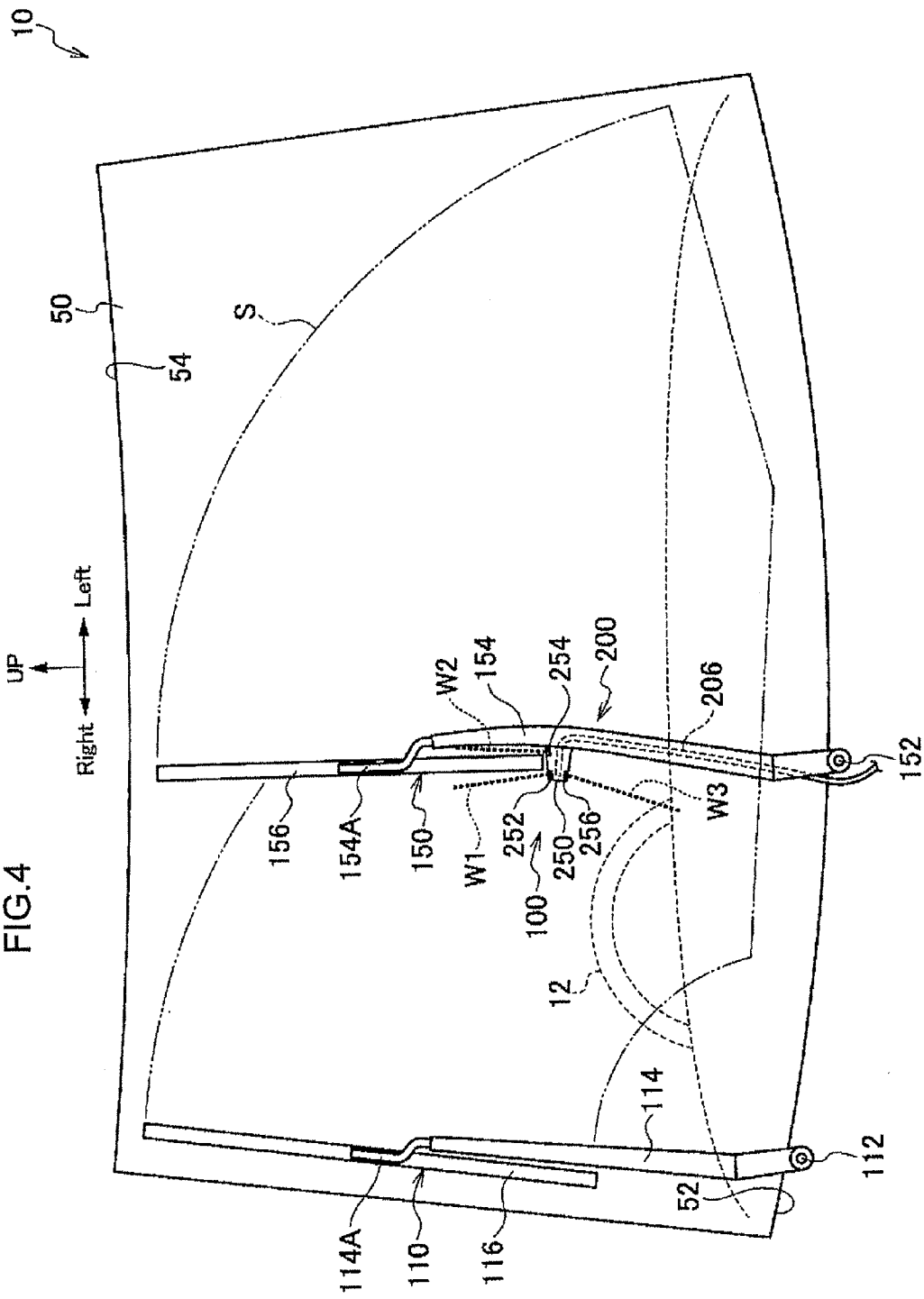
FIG. 4 illustrates the wiper device for a vehicle shown in FIG. 1, and is a front view of a state in which the driver's seat side wiper and the front passenger's seat side wiper are disposed at the reversal positions.

To describe more concretely, the driver's seat side wiper 110 and the front passenger's seat side wiper 150 are reciprocally rotated between stopped positions (lower reversal positions) shown in FIG. 1 and reversal positions (upper reversal positions) shown in FIG. 4, and wipe the surface of the windshield glass 50 by reciprocally rotating in states in which blade rubbers of the wiper blades 116, 156 tightly contact the windshield glass 50. Note that the region, that is wiped by the wiper blades 116, 156 of the driver's seat side wiper 110 and the front passenger's seat side wiper 150 at this time, is wiping region S shown by the imaginary line (two-dot chain line). Further, the driver's seat side wiper 110 and the front passenger's seat side wiper 150 rotate in the same direction. Note that, in the present embodiment, the wiping surface area of the driver's seat side wiper 110 at the driver's seat side that is the main wiping side is wider than the wiping surface area of the front passenger's seat side wiper 150 at the front passenger's seat side that is the secondary wiping side.

At the stopped positions shown in FIG. 1, the wiper blades 116, 156 of the driver's seat side wiper 110 and the front passenger's seat side wiper 150 are accommodated in substantially horizontal states along the lower edge portion 52 of the windshield glass 50. Further, the driver's seat side wiper 110 and the front passenger's seat side wiper 150 are controlled so as to stop at these stopped positions. Namely, the stopped states in which the driver's seat side wiper 110 and the front passenger's seat side wiper 150 do not operate are at these stopped positions.

Note that the sides of the driver's seat side wiper 110 and the front passenger's seat side wiper 150 that move from the stopped positions of FIG. 1 toward the reversal positions of FIG. 4 (side S1, side S2 shown in FIG. 3) are called the "reciprocal rotation outbound sides", and the sides that move from the reversal positions of FIG. 4 toward the stopped positions of FIG. 1 (side S3, side S4 shown in FIG. 3) are called the "reciprocal rotation inbound sides".

As shown in FIG. 2, the cleaning liquid jetting-out device 200 has a cleaning liquid tank 202 that stores cleaning liquid W. Further, the cleaning liquid jetting-out device 200 has a pump 204, and the pump 204 communicates with a jetting-out nozzle 250 via a hose 206. Accordingly, at the cleaning liquid jetting-out device 200, when the pump 204 operates, the cleaning liquid W stored in the cleaning liquid tank 202 is jetted-out from the jetting-out nozzle 250.

The jetting-out nozzle 250 of the cleaning liquid jetting-out device 200 is provided at the wiper arm 154 of the front passenger's seat side wiper 150. Further, the hose 206 is routed within the wiper arm 154. Note that, in the present exemplary embodiment, the jetting-out nozzle 250 of the cleaning liquid jetting-out device 200 is provided only at the front passenger's seat side wiper 150, and a jetting-out nozzle is not provided at the driver's seat side wiper 110.

A jetting-out opening 252 that jets-out cleaning liquid W1 toward the reciprocal rotation outbound side of the wiper blade 156 of the front passenger's seat side wiper 150, a jetting-out opening 254 that jets-out cleaning liquid W2 toward the reciprocal rotation inbound side of the wiper blade 156 of the front passenger's seat side wiper 150, and a jetting-out opening 256 that jets-out cleaning liquid W3 toward the reciprocal rotation outbound side of the wiper blade 116 of the driver's seat side wiper 110 at the stopped position (in the stopped state), are provided at the jetting-out nozzle 250.

Note that a jetting-out opening 258 and cleaning liquid W4, that are illustrated by imaginary lines (two-dot chain lines) in FIG. 2, are described later.

<Operation and Effects>

The operation and effects of the present embodiment are described next.

As shown in FIG. 1, FIG. 3 and FIG. 4, at the wiper device 100 for a vehicle, due to the driver's seat side wiper 110 and the front passenger's seat side wiper 150 reciprocally rotating with the pivot shafts 112, 152 being the rotational axes respectively, the wiper blades 116, 156 wipe-off raindrops and the like on the surface (the outer side surface in the plane direction/the vehicle front side surface) of the windshield glass 50.

Further, when cleaning (wiping-off and removing) dirt that has adhered to the surface of the windshield glass 50, due to the driver's seat side wiper 110 and the front passenger's seat side wiper 150 being reciprocally rotated while the cleaning liquid W is jetted-out from the jetting-out nozzle 250, dirt, such as the oil film and dust and the like that has adhered to the windshield glass 50, is wiped-off by the wiper blades 116, 156 and cleaned by the cleaning liquid W. Note that, hereinafter, the operation of the wiping and cleaning by the wiper blades 116, 156 by the cleaning liquid W is called "wiping and cleaning".

Next, this wiping and cleaning of the windshield glass 50 by the cleaning liquid W is described in detail.

As shown in FIG. 1, at the stopped positions, the cleaning liquids W1, W2, W3 are jetted-out from the jetting-out nozzle 250. The cleaning liquid W is supplied to the reciprocal rotation outbound side of the wiper blade 156 of the front passenger's seat side wiper 150 by the cleaning liquid W1 jetted-out from the jetting-out opening 252, and the cleaning liquid W is supplied to the reciprocal rotation outbound side of the wiper blade 116 of the driver's seat side wiper 110 by the cleaning liquid W3 jetted-out from the jetting opening 256. Note that the cleaning liquid W is supplied also to the reciprocal rotation inbound side of the wiper blade 156 of the front passenger's seat side wiper 150 by the cleaning liquid W2 jetted-out from the jetting-out opening 254 of the jetting-out nozzle 250.

After the cleaning liquid W is supplied to the respective reciprocal rotation outbound sides of the wiper blades 116, 156 of the driver's seat side wiper 110 and the front passenger's seat side wiper 150 in this way, the reciprocal rotation operation of the driver's seat side wiper 110 and the front passenger's seat side wiper 150 starts, and the driver's seat side wiper 110 and the front passenger's seat side wiper 150 move from the stopped positions of FIG. 1 toward the reversal positions (upper reversal positions) of FIG. 4. At this time, as shown in FIG. 3, the respective reciprocal rotation outbound sides of the driver's seat side wiper 110 and the front passenger's seat side wiper 150 at the windshield glass 50 (S1, S2 shown in FIG. 3) are wiped and cleaned by the cleaning liquids W1, W2 that were supplied to the supplied reciprocal rotation outbound sides at the stopped positions.

Note that, during the reciprocal rotation operation, the pump 204 (see FIG. 2) continues to be driven, and the cleaning liquids W1, W2, W3 are continually jetted-out from the jetting-out nozzle 250. Accordingly, the cleaning liquid W2 is supplied to the reciprocal rotation outbound side of the wiper blade 156 of the front passenger's seat side wiper 150 during operation as well.

When the driver's seat side wiper 110 and the front passenger's seat side wiper 150 reach the reversal positions of FIG. 4 (upper reversal positions), this time, they move toward the stopped positions shown in FIG. 1 (lower reversal positions). As shown in FIG. 3, the respective reciprocal rotation inbound sides of the wiper blades 116, 156 of the driver's seat side wiper 110 and the front passenger's seat side wiper 150 (S3, S4 shown in FIG. 3) at the the windshield glass 50 are wiped and cleaned by the remaining liquid of the cleaning liquid of the time of moving to the reversal positions.

Further, the cleaning liquid W2, that is jetted-out from the jetting-out opening 254 of the jetting-out nozzle 250, is supplied to the reciprocal rotation inbound side of the wiper blade 156 of the front passenger's seat side wiper 150, and the reciprocal rotation inbound side of the wiper blade 156 of the front passenger's seat side wiper 150 is wiped and cleaned by this cleaning liquid W2 as well. Accordingly, the cleaning power of the reciprocal rotation inbound side of the front passenger's seat side wiper 150 at the windshield glass 50 improves.

At this time, as shown in FIG. 3, the cleaning liquid W3 is jetted-out from the jetting-out opening 256 of the jetting-out nozzle 250, but the cleaning liquid W3 does not stick (adhere) to the reciprocal rotation outbound side S1 of the driver's seat side wiper 110. Accordingly, the cleaning liquid W does not remain without being wiped-off at the driver's seat side of the windshield glass 50. Accordingly, the visibility of the driver's seat side of the windshield glass 50 becomes better by that much.

The driver's seat side wiper 110 and the front passenger's seat side wiper 150 move again from the stopped positions (lower reversal positions) toward the reversal positions (upper reversal positions).

Further, due to the driver's seat side wiper 110 and the front passenger's seat side wiper 150 repeating the reciprocal rotation operation plural times while jetting-out the cleaning liquids W1, W2, W3, dirt, such as the oil film and dust and the like that has adhered to the windshield glass 50, is wiped and cleaned by the wiper blades 116, 156.

Here, in the above description, due to the driver's seat side wiper 110 and the front passenger's seat side wiper 150 being reciprocally rotated while the cleaning liquid W is jetted-out from the jetting nozzle 250, the dirt, such as the oil film and dust and the like that has adhered to the windshield glass 50, is wiped-off by the wiper blades 116, 156 and cleaned by the cleaning liquid W. Further, during the reciprocal rotation operation, the pump 204 (see FIG. 2) continues to be driven, and the cleaning liquids W1, W2, W3 are continually jetted-out from the jetting-out nozzle 250.

However, wiper devices for a vehicle that also have cases in which cleaning is not carried out while the cleaning liquid W is jetted-out continually each time, also are included in the present invention.

For example, in a so-called "cleaning liquid (washer) interlocking wiper device", when a cleaning liquid jetting-out switch that causes cleaning liquid to be jetted-out is turned ON (e.g., when a wiper operation lever that is provided at the base or the like of the steering wheel is pulled forward), cleaning liquid is jetted-out from the jetting-out nozzle, and, after several seconds, the wipers activate and start to move reciprocally. At this time, when the cleaning liquid jetting-out switch is turned OFF immediately (e.g., when a hand is removed and put back from the wiper operation lever), the jetting-out of the cleaning liquid is stopped, and, after the wipers rotate reciprocally several times, the wipers stop at the stopped positions. However, when the cleaning liquid jetting-out switch continues to be turned ON (e.g., when the wiper operation lever continues to be pulled forward), the wipers continue to repeat the reciprocal rotation while the cleaning liquid continues to be jetted-out. At this time, the above-described operation and effects are exhibited. Then, when the cleaning liquid jetting-out switch is turned OFF (e.g., when a hand is removed and put back from the wiper operation lever), the wipers rotate reciprocally several times, and thereafter, stop at the stopped positions.

COMPARATIVE EXAMPLE

Figure 6:
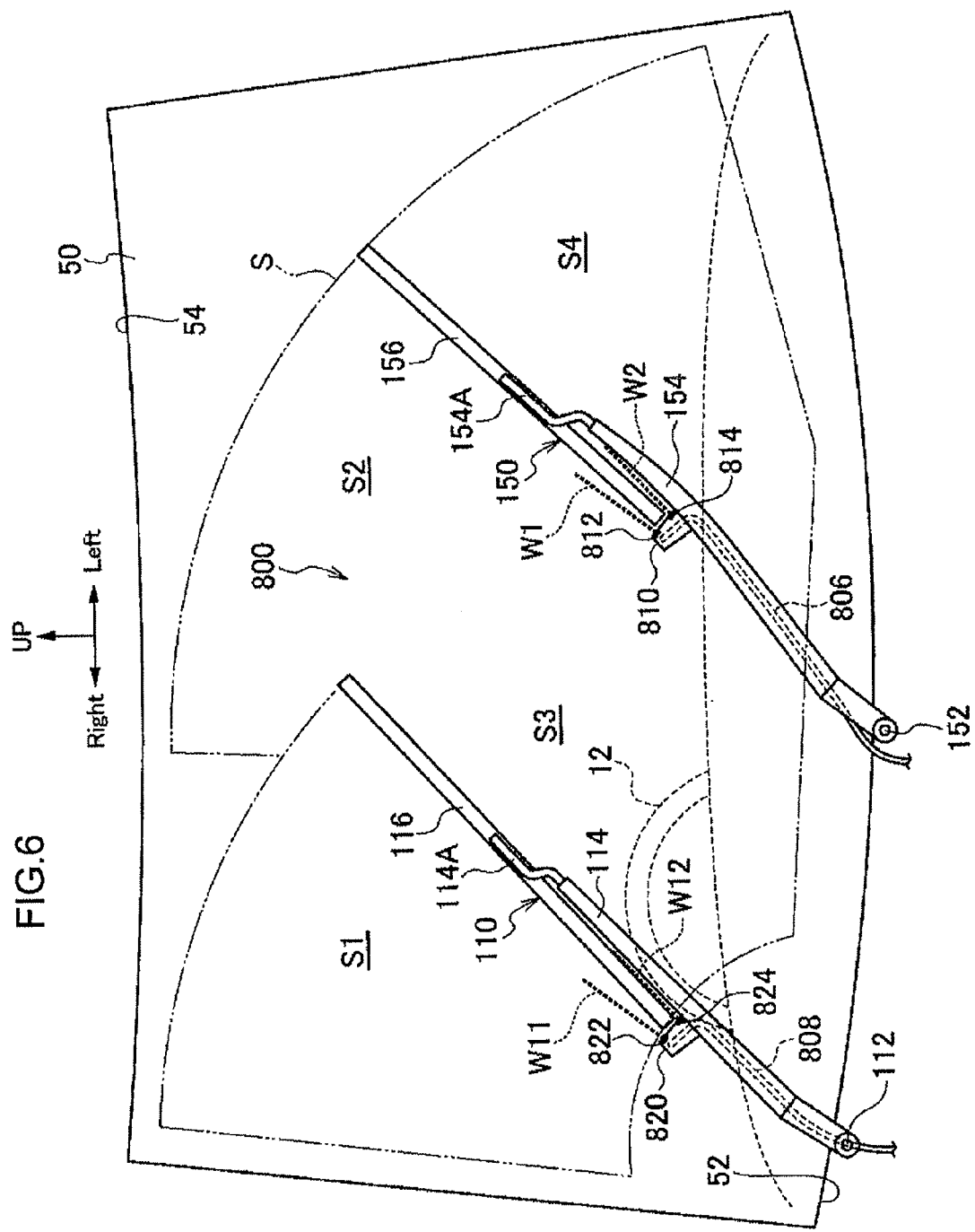
FIG. 6 illustrates a wiper device for a vehicle of a comparative example, and is a front view of a state in which a driver's seat side wiper and a front passenger's seat side wiper are disposed at intermediate positions that are between stopped positions and reversal positions.

A wiper device 800 for a vehicle, that serves as a comparative example and is shown in FIG. 6, is contemplated here.

The wiper device 800 for a vehicle of a comparative example that is shown in FIG. 6 has jetting-out nozzles 810, 820 respectively at the wiper arm 154 of the front passenger's seat side wiper 150 and the wiper arm 114 of the driver's seat side wiper 110. Further, the jetting-out nozzles 810, 820 have jetting-out openings 812, 822 that jet-out cleaning liquids W1, W11 toward the reciprocal rotation outbound sides of the wiper blades 156, 116 respectively, and jetting-out openings 814, 824 that jet-out cleaning liquids W2, W12 toward the reciprocal rotation inbound sides of the wiper blades 116, 156.

At the wiper device 800 for a vehicle of such a comparative example, when the wiper blades move from the reversal positions (upper reversal positions) to the stopped positions (lower reversal positions), the cleaning liquid W11 that is jetted-out from the jetting-out opening 822 of the jetting-out nozzle 820 of the driver's seat side wiper 110 is jetted-out toward the driver's seat side (S1) of the windshield glass 50 and adheres and remains thereat. Accordingly, when the wiper blades move to the reciprocal rotation inbound sides, a mechanism or control for making it such that the cleaning liquid W11 is not jetted-out at the reciprocal rotation outbound side (S1) of the wiper blade 116 of the driver's seat side wiper 110 is needed.

Further, hoses 806, 808 must be routed respectively at the wiper arm 154 of the front passenger's seat side wiper 150 and the wiper arm 114 of the driver's seat side wiper 110.

In contrast, in the present embodiment, when the wiper blades move from the reversal positions to the stopped positions, cleaning liquid does not stick (adhere) to the reciprocal rotation outbound side (S1) of the wiper blade 116 of the driver's seat side wiper 110. Namely, the cleaning liquid is easily prevented form adhering to the reciprocal rotation outbound side (S1) of the wiper blade 116, without using a mechanism or control or the like that is such that the cleaning liquid does not stick (adhere) to the reciprocal rotation outbound side (S1) of the wiper blade 116.

Further, in the present embodiment, the hose 206 is merely routed in the wiper arm 154 of the front passenger's seat side wiper 150, and a hose is not routed in the driver's seat side wiper 110. Accordingly, as compared with the comparative example, the number of parts and number of assembly processes are reduced, and the manufacturing cost can be kept down.

<Other Points>

Note that the present embodiment is not limited to the above-described embodiment.

In the above-described embodiment, the pivot shafts 112, 152 are provided at the vehicle transverse direction right side end portion and the vehicle transverse direction substantially central portion at the lower side of the lower edge portion 52 of the windshield glass 50, and the driver's seat side wiper 110 and the front passenger's seat side wiper 150 are structured so as to rotate in the same rotating direction, but the present invention is not limited to this. The wiper device for a vehicle may be a wiper for a vehicle of any type of structure provided that the present invention can be applied thereto.

Figure 5:
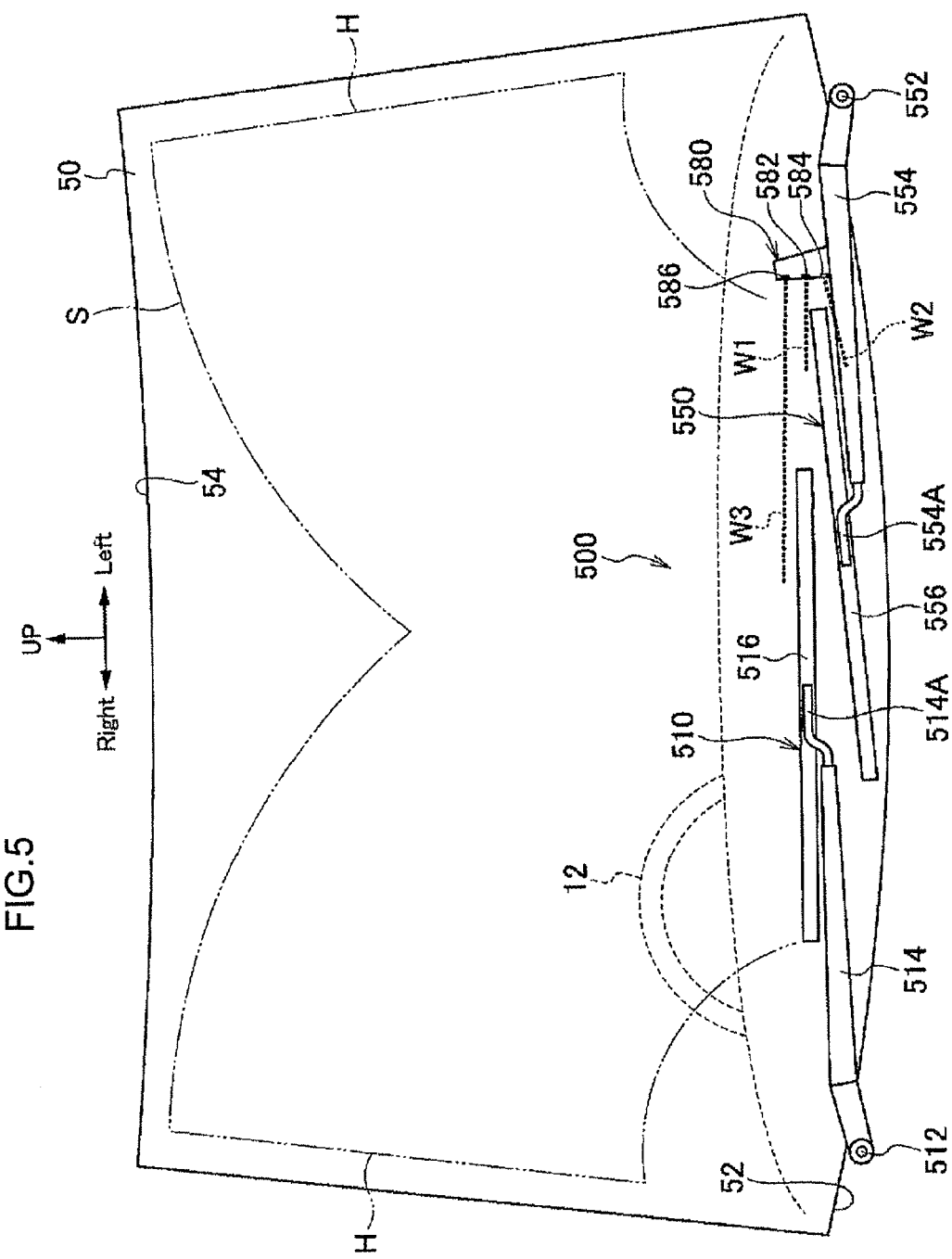
FIG. 5 illustrates a wiper device for a vehicle relating to another embodiment of the present invention, and is a front view of a state in which a driver's seat side wiper and a front passenger's seat side wiper are disposed at stopped positions.

For example, the wiper device for a vehicle may be a wiper device 500 for a vehicle such as that of another embodiment shown in FIG. 5.

In the wiper device 500 for a vehicle of the other embodiment shown in FIG. 5, a pivot shaft 512 of a driver's seat side wiper 510, that serves as an example of a main wiping side wiper, is provided at the lower side of the vehicle transverse direction right side end portion at the lower edge portion 52 of the windshield glass 50, and a pivot shaft 552 of a front passenger's seat side wiper 550, that serves as an example of a secondary wiping side wiper, is provided at the lower side of the vehicle transverse direction left side end portion at the lower edge portion 52 of the windshield glass 50. Further, at the driver's seat side wiper 510 and the front passenger's seat side wiper 550, wiper blades 516, 556 reciprocally rotate between from stopped positions (lower reversal positions) shown in FIG. 5 to reversal positions (upper reversal positions) of the positions of lines H. Note that the driver's seat side wiper 510 and the front passenger's seat side wiper 550 rotate in opposite directions.

A jetting-out nozzle 580 is provided at a wiper arm 554 of the front passenger's seat side wiper 550. A jetting-out opening 582 that jets-out the cleaning liquid W1 toward the reciprocal rotation outbound side of the wiper blade 556 of the front passenger's seat side wiper 550, a jetting-out opening 584 that jets-out the cleaning liquid W2 toward the reciprocal rotation inbound side of the wiper blade 556 of the front passenger's seat side wiper 550, and a jetting-out opening 586 that jets-out the cleaning liquid W3 toward the reciprocal rotation outbound side of the wiper blade 516 of the driver's seat side wiper 510 at the stopped position (in the stopped state), are provided at the jetting-out nozzle 580.

In the wiper device 500 for a vehicle of the present embodiment as well, after the cleaning liquid W is supplied to the respective reciprocal rotation outbound sides of the wiper blades 516, 556 that are provided at arm pieces 514A, 554A of wiper arms 514, 554 at the driver's seat side wiper 510 and the front passenger's seat side wiper 550, the driver's seat side wiper 510 and the front passenger's seat side wiper 550 operate, and the driver's seat side wiper 510 and the front passenger's seat side wiper 550 move from the stopped positions toward the reversal positions shown by lines H. At this time, the respective reciprocal rotation outbound sides of the driver's seat side wiper 510 and the front passenger's seat side wiper 550 at the windshield glass 50 are wiped and cleaned by the cleaning liquids W1, W2 that were supplied to the reciprocal rotation outbound sides at the stopped positions.

When the driver's seat side wiper 510 and the front passenger's seat side wiper 550 reach the reversal positions, this time, they move toward the stopped positions. The respective reciprocal rotation inbound sides of the wiper blades 516, 556 of the driver's seat side wiper 510 and the front passenger's seat side wiper 550 at the windshield glass 50 are wiped and cleaned by the remaining liquid of the cleaning liquid of the time of moving to the reversal positions. Further, the cleaning liquid W2, that is jetted-out from the jetting-out opening 584 of the jetting-out nozzle 580, is supplied to the reciprocal rotation inbound side of the wiper blade 556 of the front passenger's seat side wiper 550, and the reciprocal rotation inbound side of the wiper blade 556 of the front passenger's seat side wiper 550 is wiped and cleaned by this cleaning liquid W2 as well.

At this time, the cleaning liquid W3 is jetted-out from the jetting-out opening 586 of the jetting-out nozzle 580, but the cleaning liquid W is not jetted-out to the reciprocal rotation outbound and inbound sides of the driver's seat side wiper 510. Accordingly, the cleaning liquid W does not remain without being wiped-off at the driver's seat side of the windshield glass 50. Accordingly, the visibility of the driver's seat side of the windshield glass 50 becomes better by that much.

Further, due to the driver's seat side wiper 510 and the front passenger's seat side wiper 550 repeating the reciprocal rotation operation while jetting-out the cleaning liquids W1, W2, W3, dirt, such as the oil film and dust and the like that has adhered to the windshield glass 50, is wiped and cleaned by the wiper blades 516, 556.

Note that, in the above-described embodiment, the vehicle transverse direction right side at which the steering wheel 12 is disposed is made to be the driver's seat side, and the vehicle transverse direction left side is made to be the front passenger's seat side, but the present invention is not limited to this.

The vehicle transverse direction left side at which the steering wheel 12 is disposed may be made to be the driver's seat side, and the vehicle transverse direction right side may be made to be the front passenger's seat side. Note that, in this case, the wiper devices 100, 500 for a vehicle of the above-described embodiments are structured with the left and right reversed.

Further, although the pivot shafts 112, 152, 512, 552 that are the rotation shafts are provided at the lower side of the lower edge portion 52 of the windshield glass 50 in the above-described embodiments, the present invention is not limited to this. Pivot shafts that are the rotation shafts may be provided at the upper side of an upper edge portion 54 of the windshield glass 50.

Further, for example, the three jetting-out openings that are the jetting-out opening 252, 582 that jets-out the cleaning liquid W1 toward the reciprocal rotation outbound side of the wiper blade 156, 556 of the front passenger's seat side wiper 150, 550, the jetting-out opening 254 that jets-out the cleaning liquid W2 toward the reciprocal rotation inbound side of the wiper blade 156, 556 of the front passenger's seat side wiper 150, 550, and the jetting-out opening 256, 586 that jets-out the cleaning liquid W3 toward the reciprocal rotation outbound side of the wiper blade 116, 516 of the driver's seat side wiper 110, 510 at the stopped position, are provided at the jetting-out nozzle 250, 580. However, the present invention is not limited to this.

It suffices for at least the two that are the jetting-out opening 252, 582 that jets-out the cleaning liquid W1 toward the reciprocal rotation outbound side of the wiper blade 156, 556 of the front passenger's seat side wiper 150, 550, and the jetting-out opening 256, 586 that jets-out the cleaning liquid W3 toward the reciprocal rotation outbound side of the wiper blade 116, 516 of the driver's seat side wiper 110, 510 at the stopped position, to be provided at the jetting-out nozzle.

Further, when the cleaning power is to be further improved, in addition to these three jetting-out openings that jet-out the cleaning liquids W1, W2, W3, another jetting-out opening may be provided. For example, the jetting-out opening 258, that jets-out the cleaning liquid W4 toward the reciprocal rotation inbound side of the wiper blade 116 of the driver's seat side wiper 110 at the stopped position, may be provided as shown in FIG. 2.

Moreover, although the plural jetting-out openings are provided at the one jetting-out nozzle in the above-described embodiments, the present invention is not limited to this. Plural jetting-out nozzles may be provided at the front passenger's seat side wiper 150, 550. For example, two that are a jetting-out nozzle has the jetting-out opening 252, 582 and the jetting-out opening 254, 584, and a jetting-out nozzle that has the jetting-out opening 256, 586, may be provided at the front passenger's seat side wiper 150, 550.

Note that an arm piece is included at the wiper arm. Accordingly, the jetting-out nozzle may be provided at the arm piece. Further, when there are plural jetting-out nozzles, one or plural thereof may be provided at the wiper arm as in the above-described embodiments, and the remaining one or plural thereof may be provided at the arm piece.

Note that a jetting-out nozzle, that does not have the jetting-out opening 822 that jets-out the cleaning liquid W11 toward the reciprocal rotation outbound side of the wiper blade 116 in the comparative example shown in FIG. 6 (that has the jetting-out opening 824 that jets-out the cleaning liquid W12 toward the reciprocal rotation inbound side of the wiper blade 116), may be provided at the driver's seat side wiper 110.

Further, in the above-described embodiments, the present invention is applied to a wiper device for a vehicle that wipes the windshield glass at the front side of a vehicle (the front windshield glass), but is not limited to this. For example, the present invention may be applied to a wiper device for a vehicle that wipes the windshield glass at the rear side of a vehicle (the rear windshield glass).

The invention claimed is:
1. A wiper device for a vehicle, comprising:
   a main wiping side wiper that wipes a main wiping side of a windshield glass via a main wipe blade that is provided at a main wiper arm that reciprocally rotates between a stopped position and a reversal position;

a secondary wiping side wiper that wipes a secondary wiping side of the windshield glass via a secondary wiper blade that is provided at a secondary wiper arm that reciprocally rotates between a stopped position and a reversal position, wherein the main wiping side wiper is positioned at a driver's seat side, and the secondary side wiping side wiper is positioned at a front passenger's seat side; and a jetting-out nozzle that is provided only on the secondary wiper arm of the secondary wiping side wiper at the front passenger's seat side and is attached at a position on the secondary wiper arm below both the main wiper blade and the secondary wiper blade in a direction toward the stopped position when such are in the stopped position, and that jets-out cleaning liquid respectively to both (i) a reciprocal rotation outbound side of the secondary wiper blade of the secondary wiping side wiper, and (ii) a reciprocal rotation outbound side of the main wiper blade of the main wiping side wiper at the stopped position.

2. The wiper device for a vehicle of claim 1, wherein the jetting-out nozzle jets-out the cleaning liquid to a reciprocal rotation inbound side of the secondary wiper blade of the secondary wiping side wiper.

\* \* \* \* \*